UNITED STATES PATENT OFFICE 2,006,256

TREATING SCRAP STORAGE BATTERY PLATES AND LEAD-BEARING MATERIALS OF SIMILAR COMPOSITION

Jesse O. Betterton and Charles W. Hanson, Metuchen, N. J., assignors to American Smelting and Refining Company, New York, N. Y., a corporation of New Jersey No Drawing. Application September 13, 1932, Serial No. 632,948. Renewed December 28, 1934.

11 Claims. (Cl. 75—15)

This invention relates to a new and improved method for treating lead scrap and similar materials which generally contain appreciable amounts of sulphate and various oxides. The invention further relates to a combined smelting and softening operation by which metallic lead containing only small amounts of impurities may be recovered from scrap storage battery plates and the like. The invention provides for the concentration and recovery of impurities, such as, for example, antimony, from the material being treated.

It has been customary to treat materials of the class above mentioned in a blast furnace and, while reverberatory smelting has been suggested, it has failed to generally supplant the relatively more expensive blast furnace practice due to the imperfections and disadvantages attending reverberatory smelting of such material as heretofore practised. The present invention eliminates or reduces to a minimum the objectionable features of reverberatory smelting of these materials as previously practiced and provides a commercial process whereby lead containing antimony in amounts as low as .02% or less may be economically obtained.

By the present invention scrap storage batteries or similar materials are subjected to treatment in a reverberatory furnace under conditions suitable for the formation of a molten mass comprising three layers including a lower or bottom layer of molten lead relatively free from antimony, an intermediate layer of matte of relatively small volume as compared to ordinary reverberatory or blast furnace practice, and an upper slag layer containing a relatively high concentration of antimony. Under operating conditions suitable for the formation of such a composite bath of three layers, the amount of lead and antimony fume ordinarily formed in reverberatory smelting is greatly reduced and the metal content of the bath is correspondingly increased.

Not only is the percentage of antimony in the lower layer of lead reduced, but the matte or intermediate layer is greatly reduced in volume and amount, which represents a great saving in secondary treatments of the matte. This remarkable reduction in matte formation is effected as part of our three-layer process by altering the chemical phenomena of the smelting operation. To reduce the formation of matte the lead oxide content of the charge is sufficiently maintained to react substantially with the lead sulphate and lead sulphide contained in the material charged or formed during the operation, with the result that most of the sulphur contained therein is oxidized and eliminated in a substantially metal-free gaseous state instead of combining to form matte and increasing the volume or quantity thereof. At the same time, the lower or bottom layer will contain most of the lead, which will be relatively free from antimony (generally from 1% to 1.7%), while the top layer will comprise a highly concentrated antimony slag often analyzing as much as 20% to 25% antimony and much less in volume as compared to the quantity of slag obtained under standard reverberatory practice.

In the following description is set forth one method by which the three layers above referred to may be produced, although it will be obvious that various changes and modifications may be made by those skilled in the art. Scrap storage battery plates or similar materials containing relatively high percentages of lead may be charged into a reverberatory furnace together with a definite and determined quantity of reducing material which may be in the form of carbonaceous fuel. While we prefer to use petroleum coke fines, various other reducing fuels, such as coal, coke, charcoal, wood, oil, etc., may be satisfactorily substituted for petroleum coke fines so long as they are not used in excess of the equivalent amount of petroleum coke fines, as hereinafter explained.

The quantity of petroleum coke fines used for reducing the scrap material should be approximately 1% to 1.1% of the weight of the scrap charged. Also, the charge should contain sufficient additional fuel to reduce the litharge remaining in the furnace from the preceding charge and, hence, in our preferred practice, the total petroleum coke fines in the charge amounts to approximately 1.6% of the weight of scrap possessing an ignition loss of approximately 7%. If other fuels are utilized in place of the petroleum coke, they should be added in amounts approximately equivalent to the 1.6%, above specified. It is to be noted that the amount of fuel employed in practicing the present invention is decidedly below the amounts employed in either blast furnace or reverberatory practice of the prior art.

The reducing material should be thoroughly incorporated with the lead material being treated and the mixture charged to a reverberatory furnace. While it is permissible to crowd the charging, that is, to keep the furnace filled at a desirable height until the total charge has been introduced into the furnace, it is imperative not to crowd the firing of the furnace. The throat temperature of the furnace should range from a minimum of 1600° F. to an approximate maximum of 1850° F. during the smelting operation, but at no time should the temperature materially exceed the maximum figure. We have found in melting down the last of the material charged that the firing must be retarded in order to keep within the above limits.

The firing should be continued until all of the scrap is completely melted and the molten mass in the furnace forms the desired three layers. The top layer is a molten slag consisting of oxidized lead and antimony and the slag forming constituents of the scrap material charged to the furnace. The bottom layer consists of metallic lead containing from say 1% to 2% antimony, while the intermediate layer is molten matte but in a much smaller quantity than is usual with other practices.

At this point, the top layer of slag may be treated with a suitable reducing fuel, such as finely divided petroleum coke. The fuel may be sprayed on the top of the slag layer and should be evenly distributed over the surface thereof. This operation results in reducing the lead and concentrating the antimony in the remaining slag. When the slag has reached the desired concentration, which normally is from 20% to 25% antimony, it may be removed from the furnace along with the main portion of the matte.

The remaining layer of metallic lead containing less than 2% of antimony may be allowed to remain in the furnace and softened in situ which may be accomplished by inserting water pipes into the molten lead and agitating the bath, while subjecting same to oxidizing conditions. This softening process may be continued until the antimony content of the bath proper has reached a desired minimum. Generally speaking, the antimony content will be reduced to .02% or less, within three or four hours. The softened lead may then be tapped from the furnace and the litharge formed during the softening operation together with the oxides of antimony allowed to remain in the furnace for the next charge. In making the succeeding charge to the furnace, a quantity of petroleum coke or other reducing fuel sufficient to reduce the litharge should be added to the lead scrap being treated, in addition to the 1% to 1.1% petroleum coke fines or its equivalent necessary to reduce the scrap material of the charge.

The three layer smelting operation and combined softening process above described substantially eliminate the defects which hitherto have handicapped reverberatory treatment of lead scrap materials and, at the same time, replace the usual blast furnace smelting practice.

As compared to standard blast furnace smelting the present invention possesses many advantages. In the first place, a great saving of fuel is effected, as the charge in blast furnace practice is often 10%–15% of the weight of the scrap. Again, the blast furnace practice results in the formation of a large quantity of high lead-low antimony matte which often comprises 10%–12% of the total weight of the scrap melted. In addition, the treatment of this large quantity of blast furnace matte requires entirely different processes and equipment for its treatment, which increase the expense of the process. Also, the blast smelting furnace practice results in a nearly complete reduction of lead together with a very substantial percentage of antimony (often as high as 90%) which results in the formation of an alloy containing 4% or more of antimony. On the other hand, the present invention produces lead substantially free from antimony and, while the antimonial lead produced by the blast furnace process may be softened, the cost as compared with the lead produced by the present invention would be prohibitive.

The failure of the prior art reverberatory practice to replace blast furnace smelting of lead scap may be attributed to a variety of factors. Chief among these were the production of fume and slag in large quantities. For example, it was not uncommon in the prior art practice to produce fume up to 15% of the total weight of the scrap smelted and containing as high as 10% of the total lead and 20%–25% of the total antimony. Again, slags comprising as high as 12% of the weight of the scrap treated and containing as high as 8% of the total lead and about 40% of the total antimony were quite usual. In order for the prior art reverberatory practice to compete to any degree with the blast smelting practice it was necessary to recover the values from the large amounts of fume and slag produced, but the difficulty of treating such large quantities of fume and slag and the additional expense involved explains to an extent, at least, why blast furnace smelting of lead scrap has until the present invention retained its place of prominence in the art. Finally, the metal produced by the prior art reverberatory practice would generally contain approximately 2% to approximately 2.75% antimony, whereas the lead produced by our new triple layer process contains approximately half that amount prior to the softening step and is substantially pure when it is finally ready for tapping from the furnace.

The improved process of the present invention eliminates or reduces to permissible limits the various factors which have until now held reverberatory smelting of scrap storage battery plates and the like in the background. It greatly reduces the amount of antimony and lead volatilized as well as the amount of matte formed in the furnace and substantially increases the amount of metal originally recovered. In addition, the present process allows the production of a comparatively high antimonial slag, say 20%–25%, without increasing the amount of slag for further treatment and thus renders a product of greater commercial value for the production of metallic antimony, alloys of antimony and other antimonial products. Again, the combined three layer smelting and softening process carried out as one continuous operation in the reverberatory furnace permits the recovery of soft lead which is a relatively more valuable product.

The following hypothesis is offered as an explanation, in part at least, of the new and improved results obtained by our invention. It is believed that the great reduction in the quantity of matte produced is, partially at least, due to the small amount of reducing fuel in the charge. It is thought that when too large a proportion of reducing fuel is used that the lead sulphate content of the scrap is partially reduced to the sulphide and, at the same time, the lead oxide is, in large measure, reduced to metallic lead, with the subsequent result that there is insufficient oxide to react with the sulphide for the production of metallic lead and sulphur dioxide. Hence, an excessive production of high lead-low antimony matte was the result.

The decreased amount of antimony in the bath proper is probably partially due to the small amount of reducing fuel in the original charge and it is further believed that the reduction in the proportion of matte to the scrap treated may be partly explained on the same basis as well as by the temperature at which the furnace is operated.

As above stated, one of the features of the invention is the marked decrease in volatilization of lead and antimony during the smelting process. In practice 90% of the antimony of the original charge has been consistently retained in the resulting slag and metal. This is a marked advantage over the prior reverberatory practice of which 20%–25% of the antimony was originally volatilized.

What is claimed is:

1. In the treatment of material containing high percentages of lead contaminated with antimony, such as storage batteries and the like, the process which consists of charging a quantity of such material together with approximately 1.6% of its weight of petroleum coke fines to a reverberatory furnace containing the litharge and antimony oxide resulting from the final softening stage of the preceding charge, maintaining the furnace at a temperature of 1600° F. to 1850° F. until the material is completely melted and three molten layers form in the furnace comprising a top slag layer of oxidized lead and antimony, an intermediate layer of molten matte and a bottom layer of metallic lead containing some antimony, applying finely divided petroleum coke to the top layer whereby a substantial portion of the lead in said layer is reduced to the metallic state, removing the first and intermediate layers from the bath, agitating the remaining bottom layer under oxidizing conditions until the antimony content of the softened lead is below .02% and tapping the softened lead from the furnace.

2. The process for recovering substantially pure lead from scrap storage batteries and the like, which consists in mixing a quantity of such scrap with approximately 1%–1.1% of its weight of petroleum coke, charging the mixture to a reverberatory furnace, maintaining said furnace at a temperature of from 1600° F. to 1850° F. until there is formed in the furnace three molten layers comprising a top slag layer of lead and antimony oxides, a relatively small intermediate layer of molten matte and a bottom layer of lead contaminated with antimony, removing the top and intermediate layers from the furnace and subjecting the remaining bottom layer to agitation and oxidizing conditions whereby the antimony is oxidized and forms a concentrated layer on the surface of the lead bath and tapping the softened lead from beneath the layer of oxidized antimony.

3. The process for treating scrap storage batteries possessing an ignition loss of approximately 7% which consists in mixing a given weight of said scrap with a quantity of carbonaceous fuel equivalent to approximately 1%–1.1% of said weight in petroleum coke, charging said mixture to a reverberatory furnace, maintaining said furnace at a temperature of not more than 1850° F., until the entire charge is molten and forms three layers, the bottom layer of which consists of lead containing less than 2% antimony, and separating the lower layer from the upper layers.

4. The process of treating lead scrap, such as storage batteries and the like, which comprises charging a reverberatory furnace containing litharge from the preceding charge with a mixture of such scrap and fuel in quantity just sufficient to reduce the scrap and litharge, maintaining the furnace at a temperature not exceeding 1850° F. until the charge is completely molten and comprises three molten layers consisting of a top layer of slag containing oxidized lead and antimony, an intermediate layer of matte, and a bottom layer of lead containing approximately 1%–1.7% antimony, reducing the major portion of the lead in the top layer by adding carbonaceous fuel thereto, removing the layers of slag and matte from the furnace, subjecting the remaining layer to oxidizing condition whereby the antimony with some lead is oxidized and concentrates on the surface of the bath and tapping softened lead from said furnace.

5. The method of treating scrap lead storage batteries for the recovery of metallic values therefrom which comprises smelting such materials with approximately 1% to 1.1% of a suitable reducing agent in a reverberatory furnace at a temperature not exceeding approximately 1850° F. thereby effecting the formation of three layers comprising a top layer of slag, an intermediate layer of matte and a bottom layer consisting mainly of lead, treating the top layer of slag with a reducing fuel, removing the remaining slag and matte from the furnace, and softening the lead in situ.

6. A combination smelting and softening process for the treatment of scrap lead batteries for the recovery of softened lead therefrom which consists in charging such materials together with approximately 1%–1.1% of a suitable reducing agent to a reverberatory furnace, smelting the same within an approximate temperature range of 1600° F. to 1850° F., removing the slag and matte formed during the smelting operation, and softening the lead in situ.

7. The process for treating such materials as scrap storage batteries and the like which comprises smelting such scrap at temperatures not materially exceeding 1850° F. in a furnace of the reverberatory type and in the presence of a carbonaceous reducing agent so restricted in quantity that the oxide content of the charge is sufficient to react substantially completely with the compounds of sulphur present thereby eliminating same as sulphur dioxide and producing a plurality of layers in the furnace comprising a bottom layer of lead containing only a relatively small amount of antimony, a top slag layer rich in antimony and an intermediate matte layer of small and restricted volume.

8. A process according to claim 7 characterized in that the top layer is treated with a reducing agent, the two upper layers separated from the lower layer and the latter subjected to oxidation thereby yielding refined lead.

9. The process for treating scrap storage batteries and materials of similar composition to separate the antimony and lead contents thereof which comprises mixing such materials with a sufficient amount of a carbonaceous reducing agent to smelt the charge but in such restricted quantity that the oxide content of the charge is adequate to react substantially completely with the sulphur compounds contained therein and smelting such charge in a furnace of the reverberatory type thereby materially reducing the amount of matte formed by eliminating the bulk of the sulphur in a substantially metal-free, oxidized, gaseous state.

10. The process for treating antimonial lead having an appreciable sulphate and oxide content which comprises smelting same at restricted temperatures in a furnace of the reverberatory type in the presence of a limited amount of fuel so proportioned with respect to the total oxide content of the charge that the bulk of the sulphur is eliminated in the gaseous state thereby substantially diminishing matte formation and materially decreasing metal losses by volatilization.

11. In the treatment of material containing high percentages of lead contaminated with antimony the process which comprises charging such material into a reverberatory furnace together with a relatively small amount of reducing material sufficient, however, to effect reduction of the oxide content in excess of that necessary to eliminate the bulk of the sulphur from the charge in an oxidized, gaseous form, heating the charge in the furnace until the material is completely melted and three molten layers form in the furnace comprising a top slag layer of oxidized lead and antimony, an intermediate layer of molten matte and a bottom layer of metallic lead containing some antimony, applying further quantities of reducing agent to the top layer whereby a substantial portion of the lead in the layer is reduced to the metallic state, removing the first and intermediate layers from the bath and agitating the remaining bottom layer of lead under oxidizing conditions until the antimony content of the lead is substantially eliminated.

JESSE O. BETTERTON.
CHAS. W. HANSON.